(12) United States Patent
Sekiguchi

(10) Patent No.: US 11,318,651 B2
(45) Date of Patent: May 3, 2022

(54) HEATED CYLINDER FOR RESIN MELTING IN MOLDING MACHINE

(71) Applicant: FANUC CORPORATION, Yamanashi (JP)

(72) Inventor: Shoutarou Sekiguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 79 days.

(21) Appl. No.: 16/717,743

(22) Filed: Dec. 17, 2019

(65) Prior Publication Data
US 2020/0206997 A1  Jul. 2, 2020

(30) Foreign Application Priority Data

Dec. 27, 2018  (JP) .............................. JP2018-243975

(51) Int. Cl.
*B29C 45/74* (2006.01)

(52) U.S. Cl.
CPC .................................... *B29C 45/74* (2013.01)

(58) Field of Classification Search
CPC ......... B29C 45/74; B29C 48/80; B29C 48/83; B29C 48/802; B29C 45/62; B29C 48/684; B29C 48/501
See application file for complete search history.

(56) References Cited

U.S. PATENT DOCUMENTS

| | | | | |
|---|---|---|---|---|
| 2,233,558 A | * | 3/1941 | Shaw .................... | B29C 48/832 425/449 |
| 3,327,348 A | * | 6/1967 | Roehlig ................ | B30B 11/248 366/76.9 |
| 3,780,801 A | * | 12/1973 | Irving, Jr. ............... | B29C 48/29 165/120 |
| 3,850,415 A | * | 11/1974 | Hansen ................. | B29C 48/501 366/80 |

(Continued)

FOREIGN PATENT DOCUMENTS

| JP | S58-045233 U | 3/1983 |
|---|---|---|
| JP | S59-118523 U | 8/1984 |

(Continued)

OTHER PUBLICATIONS

An Office Action; "Notice of Reasons for Refusal," mailed by the Japanese Patent Office dated Mar. 2, 2021, which corresponds to Japanese Patent Application No. 2018-243975 and is related to U.S. Appl. No. 16/717,743 with English language translation.

*Primary Examiner* — Xiao S Zhao
*Assistant Examiner* — Emmanuel S Luk
(74) *Attorney, Agent, or Firm* — Studebaker & Brackett PC

(57) ABSTRACT

To provide a heated cylinder for resin melting in a molding machine which realizes high material supply/transport performance, cost reduction, and more favorable maintenance performance, while making the plan view/plan sectional view shape of a resin charging port into a circular shape. The (Continued)

resin charging port of the heated cylinder is formed to include: an upper charging path section formed in a circular shape in a plan sectional view; a lower charging path section which is formed in a square shape or oblong hole shape in a plan sectional view; and an intermediate charging path section which smoothly links an inner surface of the upper charging path section and an inner surface of the lower charging path section.

2 Claims, 9 Drawing Sheets

(56) References Cited

U.S. PATENT DOCUMENTS

| | | | | |
|---|---|---|---|---|
| 4,863,366 | A | * | 9/1989 | Kim .................. B29C 48/29 425/376.1 |
| 4,953,279 | A | * | 9/1990 | Colby ................. B24B 33/05 29/402.06 |
| 5,145,694 | A | * | 9/1992 | Brams ................ B29C 45/62 425/174.8 R |
| 5,460,507 | A | * | 10/1995 | Takatsugi ........... B29C 45/58 264/328.14 |
| 5,486,327 | A | * | 1/1996 | Bemis ................. B01F 5/0473 264/211.21 |
| 5,909,958 | A | * | 6/1999 | Rauwendaal ....... B29C 48/501 366/76.2 |
| 6,382,948 | B1 | * | 5/2002 | Takatsugi ........... B29C 45/74 425/143 |
| 2014/0242209 | A1 | * | 8/2014 | Roberts .............. B29C 48/68 425/376.1 |
| 2016/0158980 | A1 | * | 6/2016 | Fitzpatrick ......... B29C 45/23 264/328.15 |
| 2016/0279851 | A1 | * | 9/2016 | Fitzpatrick ......... B29C 45/1756 |
| 2016/0279852 | A1 | * | 9/2016 | Fitzpatrick ......... B29C 45/47 |
| 2016/0279854 | A1 | * | 9/2016 | Fitzpatrick ......... B29C 45/74 |
| 2017/0057151 | A1 | * | 3/2017 | Clavelle ............. B29C 48/2568 |

FOREIGN PATENT DOCUMENTS

| | | | |
|---|---|---|---|
| JP | S61-010418 | A | 1/1986 |
| JP | H11-138587 | A | 5/1999 |
| JP | 2000-135725 | A | 5/2000 |
| JP | 2000-263608 | A | 9/2000 |
| JP | 2003-053811 | A | 2/2003 |
| JP | 2004-299131 | A | 10/2004 |
| JP | 2008-162093 | A * | 7/2008 |
| JP | 4157976 | B2 * | 10/2008 |
| JP | 2010-115851 | A | 5/2010 |

* cited by examiner

US 11,318,651 B2

HEATED CYLINDER FOR RESIN MELTING IN MOLDING MACHINE

This application is based on and claims the benefit of priority from Japanese Patent Application No. 2018-243975, filed on 27 Dec. 2018, the content of which is incorporated herein by reference.

BACKGROUND OF THE INVENTION

Field of the Invention

The present invention relates to a heated cylinder for resin melting in a molding machine.

Related Art

Conventionally, for example, an injection molding device of an injection molding machine includes a tubular heated cylinder 100 to which a heating unit (not shown) such as an electric heater is mounted at the outer circumference, an injection nozzle 1 is mounted to a leading end 100a in the axis line O1 direction along the injection direction, and a tubular heated cylinder 100 to which a material feed unit (not shown) such as a hopper is mounted to a side of the rear end 100b, and a screw 2 is arranged coaxially inside (for example, refer to Patent Documents 1 to 3), as shown in FIGS. 14 and 15.

In addition, the heated cylinder 100 is provided with a resin charging port 3 (resin charging path R1) which penetrates from an outer surface to an inner surface at a side of the rear end 100b, and supplies the resin material from the material feed unit to inside of the heated cylinder 100.

Furthermore, at a connection part S between the material supply unit such as a hopper and the resin charging port 3 of the heated cylinder 100, a cooling unit 4 such as a water-cooling jacket is provided for preventing the resin material from melting midway while supplying from the material supply unit to the heated cylinder 100, and the resin charging port (3) communicating with the resin input port 3 of the heated cylinder 100 is also provided to the cooling unit 4.

As shown in FIGS. 16 to 18, the resin input port 3, which is the resin charging path R1 of the heated cylinder 100, generally is formed in a circular shape (FIG. 16), elliptical shape (oblong hole shape: FIG. 17) or square shape (including a substantially square shape in which the corners are R-shaped: FIG. 18), in a plan view from above/plan sectional view), and is formed with a fixed width dimension (vertical shape) in a cross-sectional view orthogonal to the axis line O1 of the heated cylinder 100. In the case of establishing as a circular shape in a simple plan view shape, cross-sectional view shape, particularly the plan view, in this way, there is a merit in that it is possible to suppress the machining cost of the resin charging port 3, and thus the cost of the heated cylinder 100 to be low, and further, the maintenance such as cleaning being easy to do.

It should be noted that the heated cylinder 100 of the above-mentioned configuration is not limited to injection molding (injection molding machine), and can also be used in other molding machines such as extrusion molding (extrusion molding machine).

Patent Document 1: Japanese Unexamined Utility Model Application, Publication No. S59-118523
Patent Document 2: Japanese Unexamined Patent Application, Publication No. S61-10418
Patent Document 3: Japanese Unexamined Patent Application, Publication No. 2004-299131

SUMMARY OF THE INVENTION

Herein, in the case of establishing the plan view shape of the resin input port 3 as a circular shape and cross-sectional view shape cross-sectional view vertically, as in the above-mentioned heated cylinder 100, it is not possible to provide the resin charging port 3 to be larger than the inner diameter dimension (diameter dimension of the resin flow path R2) inside of the heated cylinder 100, while excelling in maintenance performance such as cleaning. For this reason, according to the inner diameter dimension of the heated cylinder 100, it is not possible to maintain a sufficiently wide area of the resin input port 3 (resin charging path R1), and an inconvenience arises such as leading to a decline in the supply/transport performance of resin material.

In other words, in the case of the shape of the resin charging port 3 being a circular shape, the size thereof and area are subject to limitations in the dimension of the inside of the heated cylinder 100. For this reason, the burden on material loading tends to arise, and becomes a factor in causing the supply/transport performance of the resin material to decline.

Incidentally, in a case where a wide area of the resin charging path R1 is necessary, for example, the shape of the resin charging port 3 is not made into a circular shape, and is often made into an oblong shape or rectangular shape in which the long-side direction follows the axis line O1 direction or a square shape.

In addition, if a step arises between the resin charging port (3) of the cooling unit 4 such as a water-cooling jacket and the resin charging port 3 of the heated cylinder 100, in the case of the flow-direction downstream side of resin material being a convex step, inconveniences arise such as a bridge of resin being produced and metering becomes unstable, and resin clogging. In the case of there being a convex step on the downstream side, resin or resinous deposits will stay in this stepped part, and tend to lead to molding imperfections such as burning and discoloration. Furthermore, an inconvenience arises in that the frequency of maintenance increases of an operator inserting a hand and/or cleaning tool into the resin charging path R1 to clean out the resin and resinous deposits piled up in the stepped part.

For this reason, the resin charging port (3) of the cooling unit 4 such as a water-cooling jacket is made in the same shape so that a step cannot form with the resin charging port 3 of the heated cylinder 100, and the resin charging port 3 is often made in a circular shape having low cost upon machining.

Therefore, a means and method has been strongly desired for realizing high material supply/transport performance and a cost reduction, and more favorable maintenance performance, while making the plan view/plan sectional view shape of the resin charging port in a circular shape.

A heated cylinder for resin melting in a molding machine according to an aspect of the present invention includes: a resin charging port which is formed to penetrate from an inner surface to an outer surface of the heated cylinder, and is a resin charging path for charging resin material to a resin flow path inside of the heated cylinder, in which the resin charging port is formed to include: an upper charging path section formed in a circular shape in a plan sectional view, and in a vertical shape of constant width direction in a longitudinal sectional view orthogonal to an axis line of the heated cylinder, and provided at a portion on an outer side in a radial direction to a center in the axis line of the heated cylinder to open at an outer surface of the heated cylinder; a lower charging path section which is formed in a square shape or oblong hole shape in a plan sectional view, in a vertical shape of constant width dimension or in a tapered shape in which gradually a width direction becomes larger or smaller as approaching towards an inner side in the radial direction in a longitudinal sectional view orthogonal to the axis line of the heated cylinder, and is provided at a portion on an inner side in the radial direction to the center of the axis line of the heated cylinder to open at an inner surface of the heated cylinder; and an intermediate charging path section which smoothly links an inner surface of the upper charging path section and an inner surface of the lower charging path section. It should be noted that the above-mentioned "square shape" includes "substantially square shape". In addition, the above-mentioned "oblong hole shape" includes "an oval shape, rectangular shape or a shape made by R machining the four corners of a rectangular shape".

According to an embodiment of the present invention, it becomes possible to realize high material supply/transport performance and a cost reduction, and more favorable maintenance performance, while making the plan view/plan sectional view shape of the resin charging port in a circular shape.

DETAILED DESCRIPTION OF THE INVENTION

Hereinafter, a heated cylinder for resin melting in a molding machine according to an embodiment of the present invention will be explained referencing FIGS. 1 to 13, and 14.

Herein, in the present embodiment, an explanation will be made with the molding machine as an injection molding machine and with the heated cylinder as a heated cylinder equipped to the injection device; however, the molding machine and heated cylinder, for example, may be the molding machine and heated cylinder for performing extrusion molding, and the present invention is not necessarily used by particularly limiting to the application of the present embodiment (injection molding).

Figure 14:
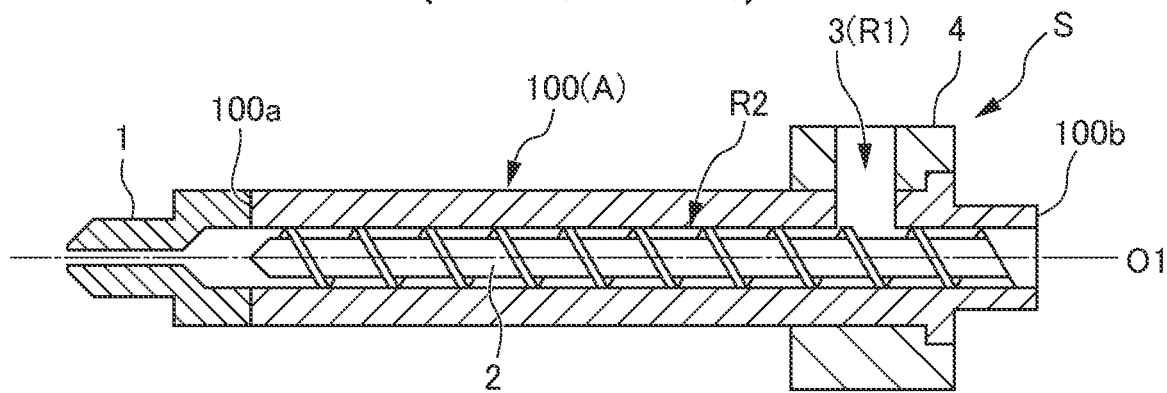
FIG. 14 is a transverse sectional view showing an injection device and heated cylinder for resin melting of a molding machine.
Figure 15:
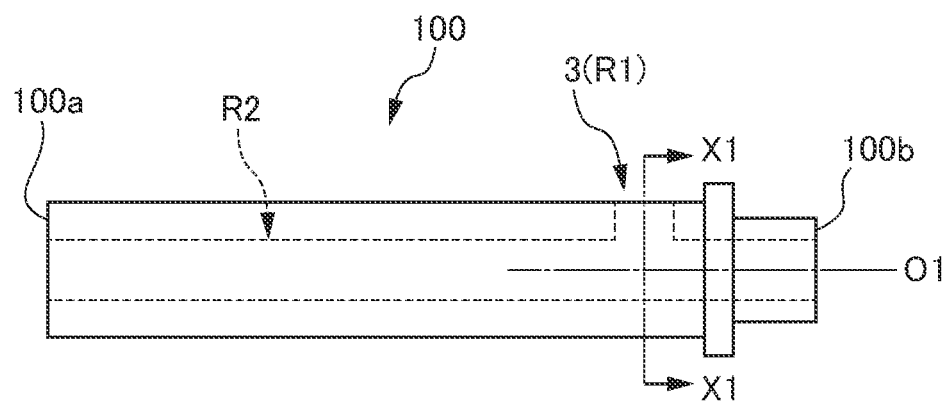
FIG. 15 is a transverse sectional view showing a heated cylinder for resin melting in a molding machine.
Figure 16:
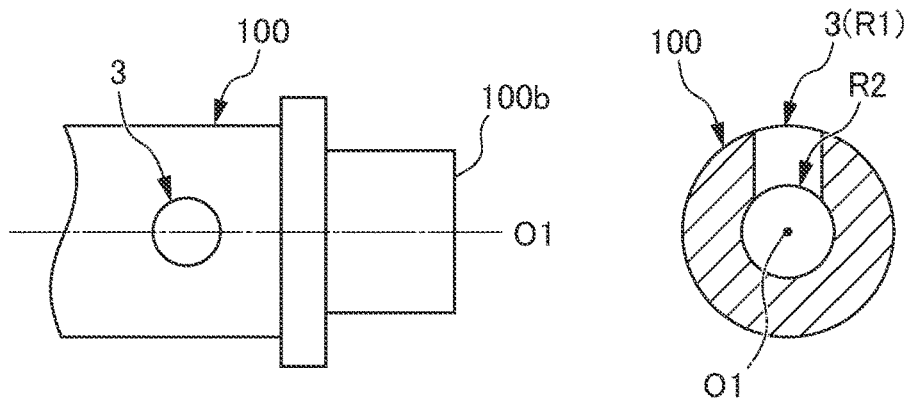
FIG. 16 is a plan view and longitudinal sectional view showing a circular resin charging port of the heated cylinder for resin melting in a molding machine.
Figure 17:
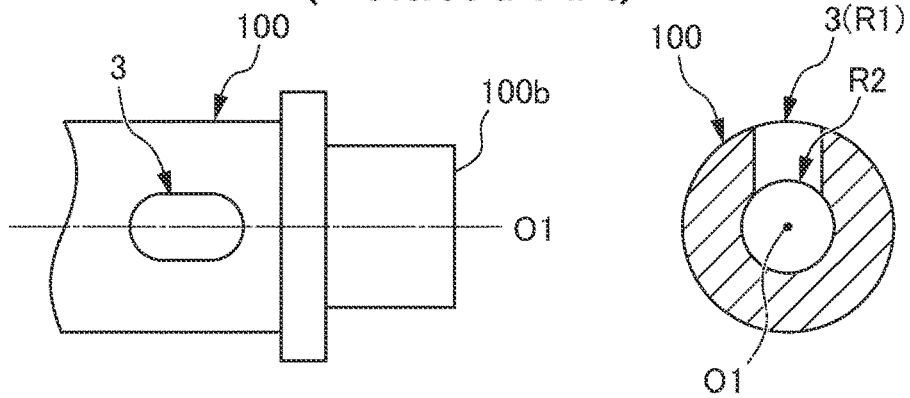
FIG. 17 is a plan view and longitudinal sectional view showing an oblong hole-shaped resin charging port of the heated cylinder for resin melting in a molding machine.
Figure 18:
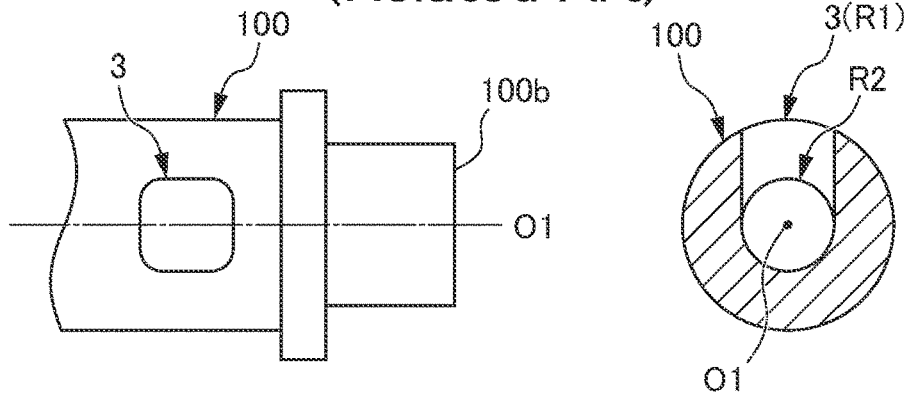
FIG. 18 is a plan view and longitudinal sectional view showing a square-shaped resin charging port of the heated cylinder for resin melting in a molding machine.

The injection device of the injection molding machine according to the present embodiment is configured to include a tubular heated cylinder A to which a heating unit (not shown) such as an electric heater is mounted to the outer circumference, an injection nozzle 1 is mounted to a leading end in an axis line O1 direction, and a material supply unit (not shown) such as a hopper is mounted to a rear end side, similarly to the injection device shown in FIG. 14, and to which a screw 2 is arranged coaxially inside thereof.

Figure 1:
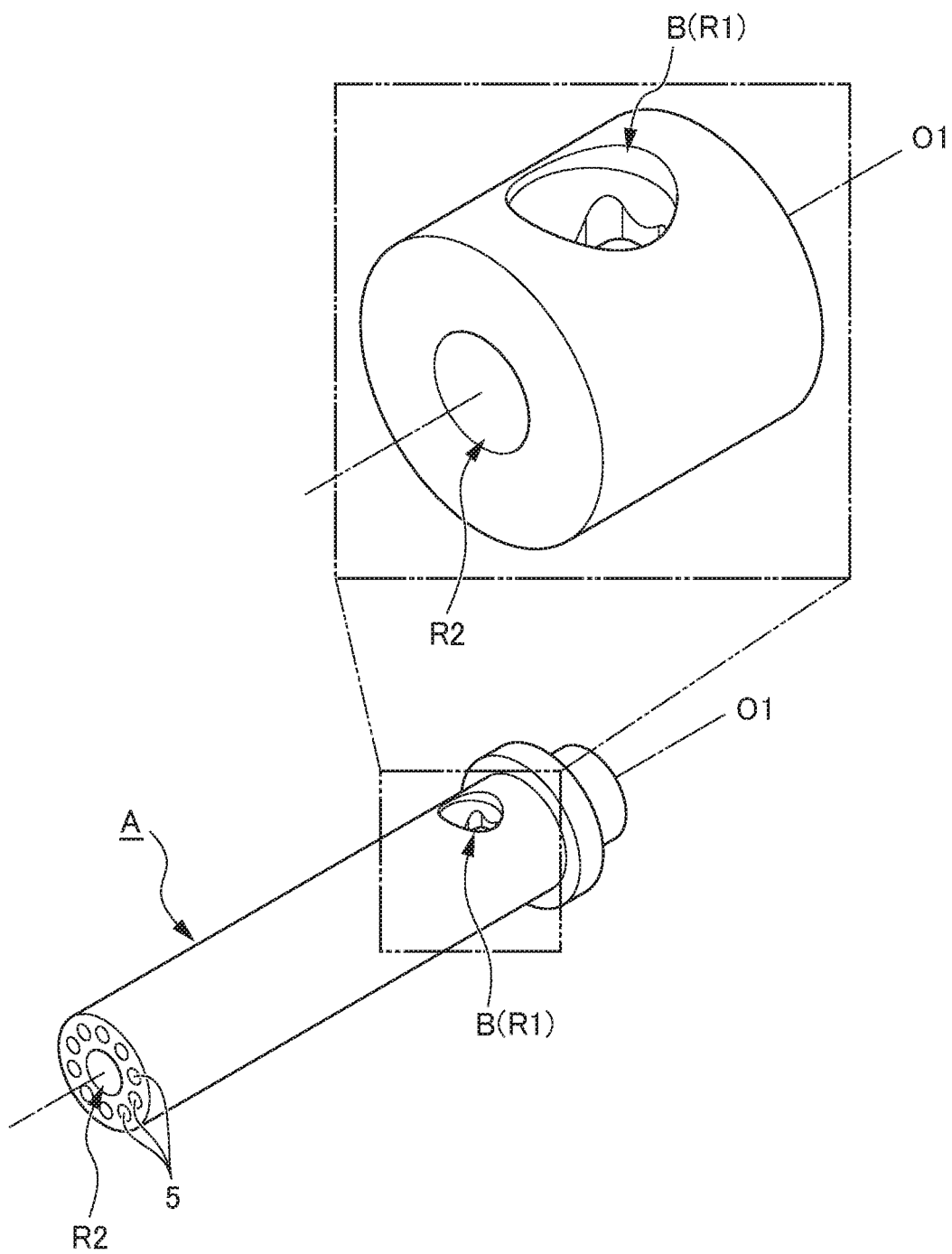
FIG. 1 is a perspective view showing a heated cylinder for resin melting in a molding machine according to an embodiment.
Figure 2:
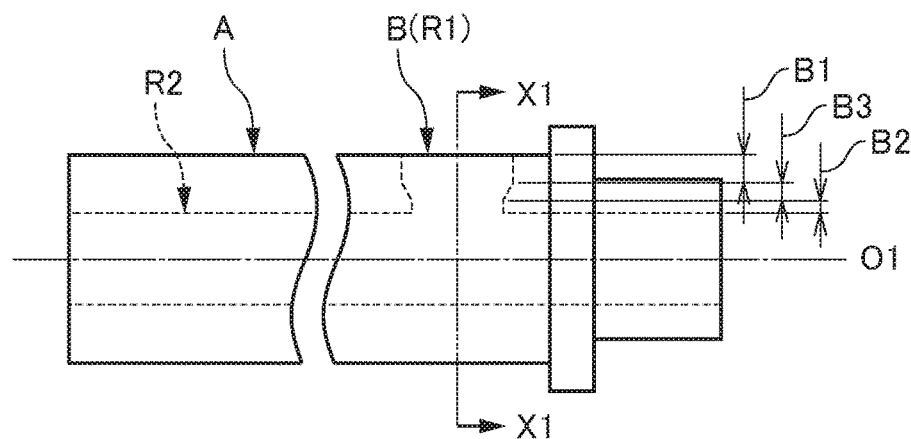
FIG. 2 is a transverse sectional view showing a heated cylinder for resin melting in a molding machine according to an embodiment.

In the heated cylinder A, as shown in FIG. 1, a resin charging port B which communicates from the outer surface to inner surface, and is for supplying resin material from a material supply part to a resin flow path R2 inside of the heated cylinder A, is provided at the rear end side in the axis line O1 direction. It should be noted that the resin charging port B forms a resin charging path R1 which feeds resin material charged from the material supply unit to the resin flow path R2 of the heated cylinder A. The reference number 5 in FIG. 1 indicates a female threaded hole for connecting the injection nozzle 1.

In the heated cylinder A, similarly to the heated cylinder 100 shown in FIG. 14, a cooling unit 4 such as a water-cooling jacket for preventing the resin material from melting prior to supplying to the resin flow path R2 inside of the heated cylinder A is equipped to a connection part S between the resin charging port B of the heated cylinder A and the resin supply unit such as a hopper. Then, it is configured to provide a resin charging port communicating with the resin charging port B of the heated cylinder A also to the cooling unit 4 such as a water-cooling jacket.

On the other hand, the resin charging port B of the heated cylinder A according to the present embodiment, as shown in FIGS. 2 to 5, is formed to include an upper feed flow part B1, lower feed flow part B2, and intermediate feed flow part B3 which smoothly links the inner surface of the upper charging path section B1 and the inner surface of the lower feed flow part B2.

The upper charging path section B1 is formed in a circular shape in a plan view and plan cross-sectional view (refer to FIG. 2), and in a perpendicular shape of constant width dimension in a longitudinal sectional view orthogonal to the axis line O1 of the heated cylinder A (refer to FIG. 4), i.e. formed in a substantially circular columnar shape; and is provided at a portion on the outer side in the radial direction to the axis line O1 center of the heated cylinder A to open at the outer surface of the heated cylinder A.

The lower charging path section B2 is formed in a square shape (including substantially square shape) in a plan view and plan cross-sectional view (refer to FIG. 2), and in a perpendicular shape of constant width dimension in a longitudinal sectional view orthogonal to the axis line O1 of the heated cylinder A, i.e. formed in a substantially square columnar shape; and is provided at a portion on the inner side in the radial direction to the axis line O1 center of the heated cylinder A to open at the inner surface of the heated cylinder A. It should be noted that the lower charging path section B2 of the present embodiment is formed in a substantially square shape in a plan view and plan cross-sectional view, with the four corners of the square shape as a convex arc surface shape (R shape).

The intermediate charging path section B3 is formed in a tapered shape (sloped surface shape) in which a gradual flat area becomes smaller approaching towards the inner side from the outer side in the radial direction of the axis line O1 center of the heated cylinder A, i.e. approaching towards the lower charging path section B2 from the upper charging path section B1; and is provided at an intermediate portion between the upper charging path section B1 and lower charging path section B2, so as to smoothly link the inner surface of the upper circular charging path section B1 and inner surface of the lower charging path section B2.

It should be noted that a connection portion of the intermediate charging path section B3 and upper charging path section B1, and a connection portion of the intermediate charging path section B3 and lower charging path section B2 are preferably formed so as to more smoothly link by machining the inner surface (R machining) in a convex circular arc surface shape, respectively. The R machining on the inner surface of such a connection portion, for example, may be performed using an appropriate means, such as end milling or EDM.

Figure 3:
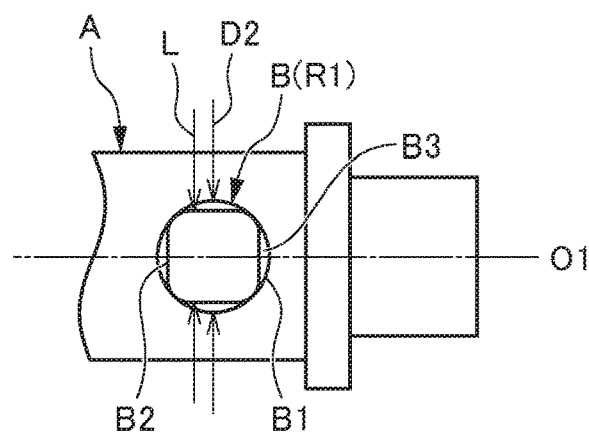
FIG. 3 is a plan view showing a heated cylinder for resin melting in a molding machine according to an embodiment.
Figure 4:
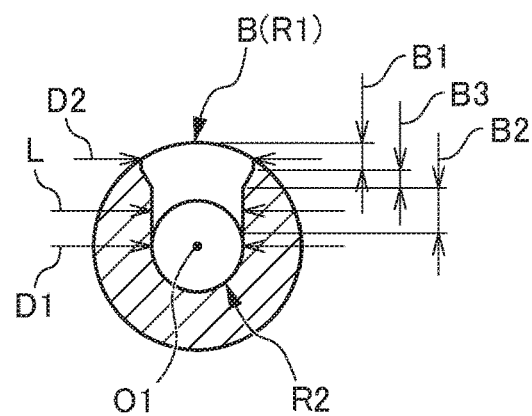
FIG. 4 is a view along the line X1-X1 in FIG. 2, which is a longitudinal sectional view orthogonal to the axis line showing a heated cylinder for resin melting of a molding machine according to an embodiment.
Figure 5:
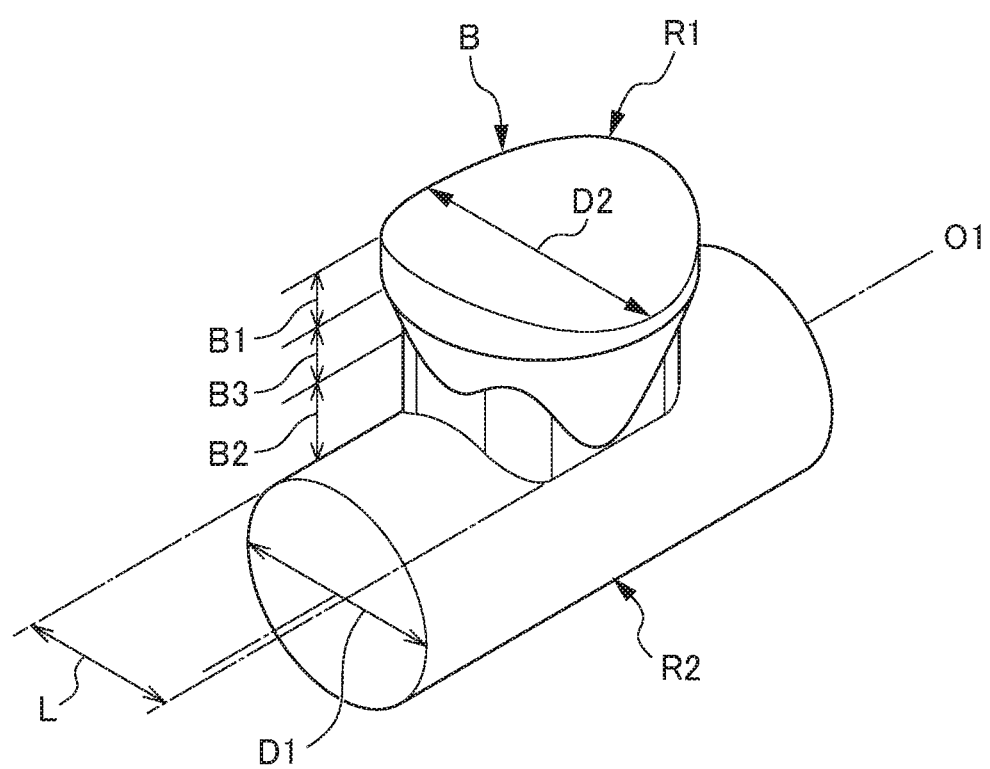
FIG. 5 is a perspective view showing a resin charging path and resin flow path of the heated cylinder for resin melting in a molding machine according to an embodiment.
Figure 6:
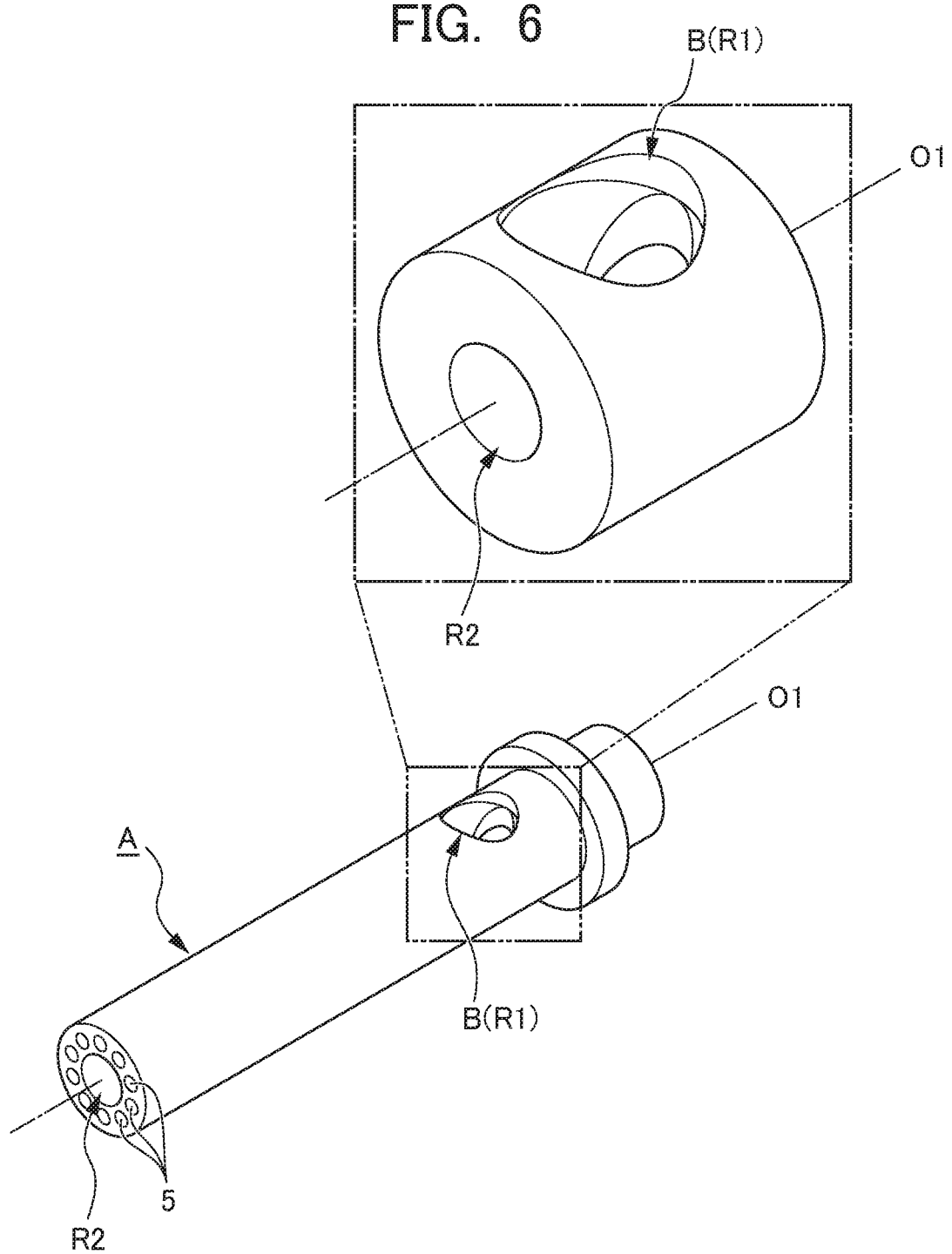
FIG. 6 is a perspective view showing a modified example of the heated cylinder for resin melting in a molding machine according to an embodiment.
Figure 7:
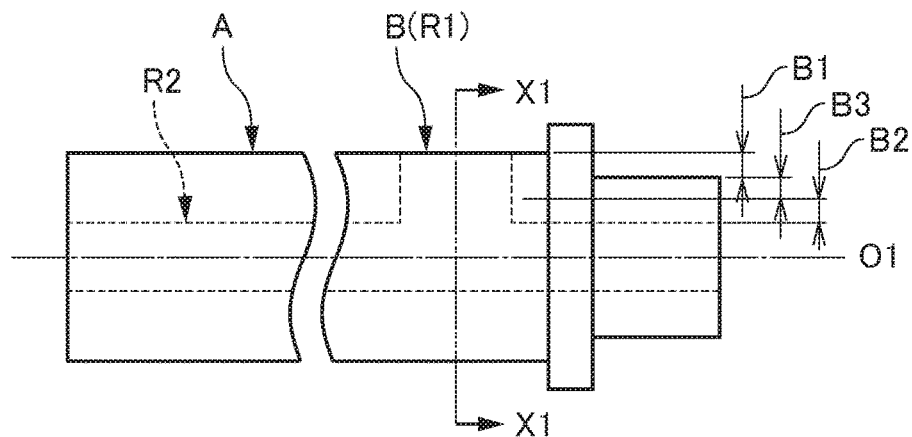
FIG. 7 is a transverse sectional view showing the heated cylinder for resin melting in FIG. 6.
Figure 8:
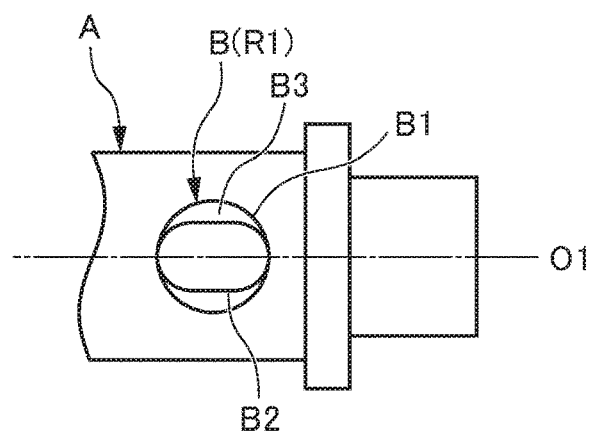
FIG. 8 is a plan view showing the heated cylinder for resin melting in the molding machine of FIG. 6.
Figure 9:
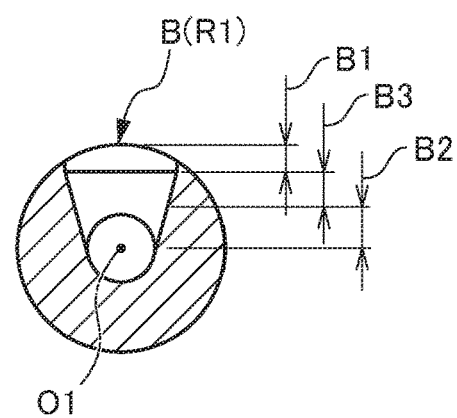
FIG. 9 is a view along the line X1-X1 in FIG. 7, which is a longitudinal sectional view orthogonal to the axis line showing a modified example of the heated cylinder for resin melting in a molding machine according to an embodiment.
Figure 10:
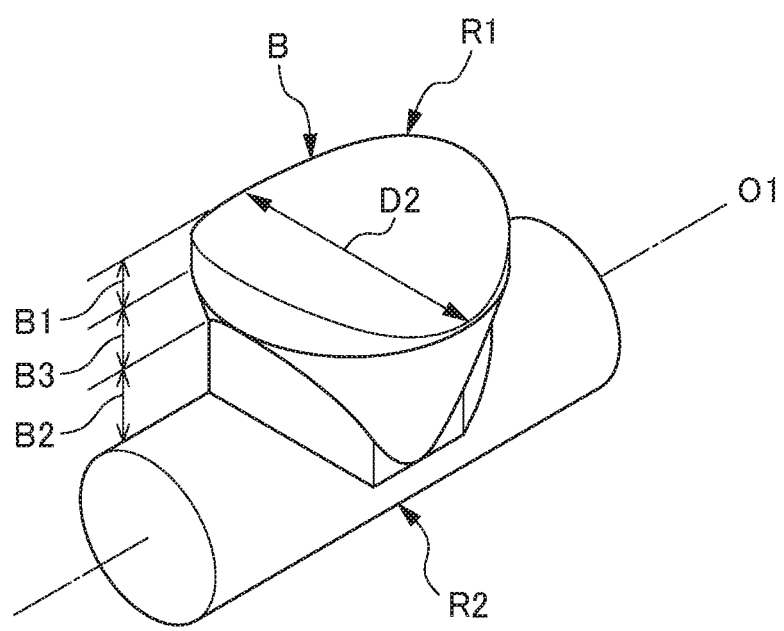
FIG. 10 is a perspective view showing a resin charging path and resin flow path of the heated cylinder for resin melting in a molding machine according to the embodiment in FIG. 6.

In the resin charging port B of the heated cylinder A according to the present embodiment, the width dimension of the lower charging path section B2 of substantially square columnar shape is made equivalent to the diameter D1 of the resin flow path R2 inside of the heated cylinder A, as shown in FIGS. 3, 4 and 5. Furthermore, the diameter D2 of the upper charging path section B1 of substantially circular columnar shape is made larger than the width dimension of the lower charging path section B2 of substantially square columnar shape, and thus the diameter D1 of the resin flow path R2 inside of the heated cylinder A.

The resin charging port B of the heated cylinder A according to the present embodiment is thereby formed so that the lower charging path section B2 of square shape fits within the region of the upper charging path section B1 of circular shape, in a plan view seen from above the heated cylinder A (refer to FIG. 3). In addition, in the present embodiment, the lower charging path section B2 of square shape is formed so that the four corners (R machined part) contact at the upper charging path section B1 of circular shape.

In other words, with the resin charging port B of the heated cylinder A according to the present embodiment, regardless of the width dimension L of the lower charging path section B2, and consequently, the size of the diameter D1 of the resin flow path R2 of the heated cylinder A, the upper charging path section B1 is formed at the diameter D2, which is at least the width dimension L of this lower charging path section B2 and diameter D1 of the resin flow path R2 of the heated cylinder A.

The resin charging port (B) of the cooling unit 4 such as a water-cooling jacket is formed in a circular shape in a plan view which is the same shape as the diameter D2 of the upper charging path section B1, a circular shape in the plan view (plan sectional view) which is the same diameter as the circular part on the outer side in the radial direction of the heated cylinder in a longitudinal sectional view, and as a vertical shape in the longitudinal sectional view. Then, the cooling unit 4 is attached to the heated cylinder A to communicate the resin charging paths R1 by making the inner surfaces of the upper charging path section B1 and the resin charging ports R1 flush with each other so as to smoothly connect, i.e. so that a step is not produced.

Herein, the lower charging path section B2 is not limited to a square shape and, for example, may be established as an oblong hole shape in a plan view, and substantially oblong hole columnar shape in the vertical shape in the longitudinal sectional view, as shown in FIGS. 7 to 10. It should be noted that oblong hole shape in the plan view (plan cross-sectional view) indicates an oval shape, rectangular shape or a shape made by R machining the four corners of a rectangular shape, in a plan view.

Even in this case, in a plan view seen from above the heated cylinder A (refer to FIG. 8), the lower charging path section B2 of oblong hole shape is formed so as to fit within a region of the upper charging path section B1 of circular shape. It should be noted that, in FIG. 8, the lower charging path section B2 of oblong hole shape is formed so as to contact with the upper charging path section B1 of circular shape.

Regardless of the size of the diameter D1 of the resin flow path R2 of the heated cylinder A, it is thereby possible to form the upper charging path section B1 in the diameter D2, which is at least the diameter D1 of the resin flow path R2 of the heated cylinder A.

It should be noted that the size of the upper charging path section B1 (diameter D2), width dimension L of the lower charging path section B2 of square shape, width dimension of the short direction of the lower charging path section B2 of oblong hole shape, and width dimension of the long direction (depth dimension) may be set freely in accordance with the required area of the resin charging path R1 or resin flow path R2.

Figure 11:
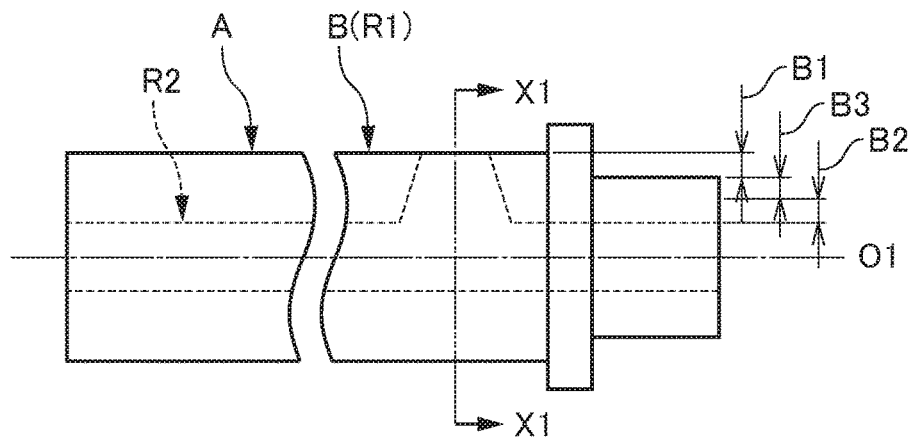
FIG. 11 is a transverse sectional view showing a modified example of a heated cylinder for resin melting in a molding machine according to an embodiment.
Figure 12:
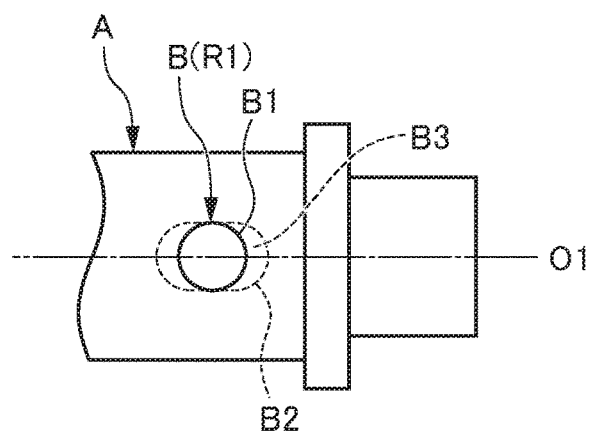
FIG. 12 is a plan view showing the heated cylinder for resin melting in the molding machine of FIG. 11.
Figure 13:
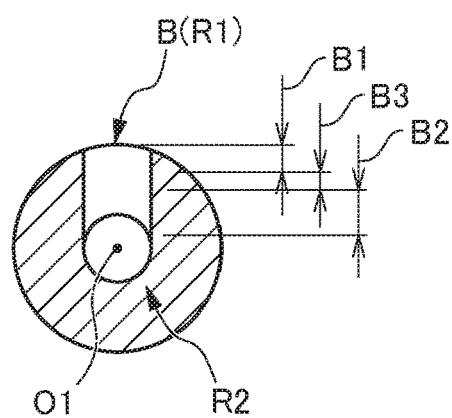
FIG. 13 is a view along the line X1-X1 in FIG. 11, which is a longitudinal sectional view orthogonal to the axis line showing a modified example of the heated cylinder for resin melting in a molding machine according to an embodiment.

Furthermore, as shown in FIGS. 11 to 13, the resin charging port B (resin charging path R1) may be formed by making the lower charging path section B2 on the inner diameter side larger than the upper charging path section B1 of circular shape on the outer diameter side.

Then, in the heated cylinder A for resin melting in a molding machine according to the present embodiment configured in the above-mentioned way, by providing the upper charging path section B1 of circular shape at the outer diameter side, providing the lower charging path section B2 of square shape or oblong hole shape at the inner diameter side, and forming/configuring the resin charging port B to smoothly link this upper charging path section B1 and lower charging path section B2 by the intermediate charging path section B3, regardless of the width dimension L of the lower charging path section B2 or size of the diameter D1 of the resin flow path R2 of the heated cylinder A, it becomes possible to form the upper charging path section B1 in the diameter D2, which is at least the width dimension L of this lower charging path section B2 and diameter D1 of this resin flow path R2 of the heated cylinder A.

In addition, since the upper charging path section B1 which is open at the outer surface of the heated cylinder A and links with the resin charging port of the cooling unit 4 such as a water-cooling jacket, is formed in a circular shape, a step will not be produced at the interface between the resin charging port of the cooling unit 4 and the upper charging path section B1 (resin charging port B).

Therefore, in the heated cylinder A for resin melting of the molding machine according to the present embodiment, it is possible to maintain a large area of the resin charging port B without producing a step, while suppressing the machining cost of the resin charging port B to a low cost.

Consequently, according to the heated cylinder A for resin melting in the molding machine according to the present embodiment, it becomes possible to realize a heated cylinder A, and thus a molding machine, which can feed resin material suitably inside the resin flow path R2, while achieving sufficient transport/supply performance of resin material, reduced cost, and preserving or improving the maintenance properties.

Although an embodiment of the heated cylinder for resin melting of a molding machine has been explained above, the present invention is not to be limited to the above-mentioned embodiment, and appropriate modifications within a scope not departing from the gist of the present invention are possible.

EXPLANATION OF REFERENCE NUMERALS 1 injection nozzle
2 screw
4 cooling unit (water-cooling jacket)
A heated cylinder (heated cylinder for resin melting)
B resin charging port
B1 upper charging path section
B2 lower charging path section
B3 intermediate charging path section
O1 axis line of heated cylinder
R1 resin charging path
R2 resin flow path
S connection part

What is claimed is:

1. A heated cylinder for resin melting in a molding machine, the heated cylinder comprising:
a resin charging port which is formed to penetrate from an inner surface to an outer surface of the heated cylinder, and is a resin charging path for charging resin material to a resin flow path inside of the heated cylinder,
wherein the resin charging port is formed to include:
an upper charging path section formed in a circular shape in a plan sectional view, and in a vertical shape of constant width direction in a longitudinal sectional view orthogonal to an axis line of the heated cylinder, and provided at a portion on an outer side in a radial direction to a center in the axis line of the heated cylinder to open at an outer surface of the heated cylinder;
a lower charging path section which is formed in a square shape or oblong hole shape in a plan sectional view and in a vertical shape of constant width dimension in a longitudinal sectional view orthogonal to the axis line of the heated cylinder, and is provided at a portion on an inner side in the radial direction to the center of the axis line of the heated cylinder to open at an inner surface of the heated cylinder, and in a plan view seen from above the heated cylinder is formed to fit within a region of the upper charging path section which is a circular shape; and
an intermediate charging path section which is formed in a tapered shape in which a gradual flat area becomes smaller approaching towards the inner side from the outer side in the radial direction of the center in a longitudinal sectional view orthogonal to the axis line of the heated cylinder to smoothly link an inner surface of the upper charging path section and an inner surface of the lower charging path section.

2. The heated cylinder for resin melting in a molding machine according to claim 1, wherein the lower charging path section is formed in the square shape in the plan sectional view.

* * * * *